US012640851B2

(12) United States Patent      (10) Patent No.:    US 12,640,851 B2

Fu                            (45) Date of Patent:       May 26, 2026

(54) METHOD AND APPARATUS FOR SENDING HARQ-ACK, METHOD AND APPARATUS FOR RECEIVING HARQ-ACK, DEVICE, AND STORAGE MEDIUM

(71) Applicant: Beijing Xiaomi Mobile Software Co., Ltd., Beijing (CN)

(72) Inventor: Ting Fu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 282 days.

(21) Appl. No.: 18/548,277

(22) PCT Filed: Mar. 4, 2021

(86) PCT No.: PCT/CN2021/079171
§ 371 (c)(1),
(2) Date: Aug. 29, 2023

(87) PCT Pub. No.: WO2022/183457
PCT Pub. Date: Sep. 9, 2022

(65) Prior Publication Data
US 2024/0178941 A1     May 30, 2024

(51) Int. Cl.
*H04W 72/0446*      (2023.01)
*H04L 1/1812*       (2023.01)
(Continued)

(52) U.S. Cl.
CPC ....... *H04L 1/1812* (2013.01); *H04W 72/0446* (2013.01); *H04W 72/1273* (2013.01); *H04W 72/21* (2023.01)

(58) Field of Classification Search
CPC ... H04L 1/1812; H04L 1/1854; H04L 1/1861; H04L 1/1864; H04L 5/0055; H04W 72/0446; H04W 72/1273; H04W 72/21
See application file for complete search history.

(56) References Cited

U.S. PATENT DOCUMENTS

| | | | |
|---|---|---|---|
| 11,831,445 B2 * | 11/2023 | Yang ..................... | H04L 1/1896 |
| 2018/0323935 A1 | 11/2018 | Yerramalli et al. | |
| 2019/0268803 A1 | 8/2019 | He et al. | |

FOREIGN PATENT DOCUMENTS

| | | |
|---|---|---|
| CN | 111277388 A | 6/2020 |
| CN | 111385080 A | 7/2020 |

(Continued)

OTHER PUBLICATIONS

International Search Report and Written Opinion of International Application No. PCT/CN2021/079171, dated Jun. 28, 2021, 22 pages.

(Continued)

*Primary Examiner* — Phuc H Tran
(74) *Attorney, Agent, or Firm* — Finnegan, Henderson, Farabow, Garrett & Dunner, L.L.P.

(57)             ABSTRACT

A method for sending a HARQ-ACK is performed by a user equipment, and includes: determining a first slot set and a second slot set, wherein the first slot set includes slots corresponding to multi-TTI PDSCHs, and the second slot set includes slots in a feedback window corresponding to a HARQ-ACK codebook and the HARQ-ACK codebook is included in a PUCCH for feeding back HARQ-ACKs of the multi-TTI PDSCHs; determining at least one slot group that is in the first slot set and is not in the second slot set and a target slot one-to-one corresponding to each slot group; determining a logical HARQ-ACK on the target slot according to an HARQ-ACK on each slot in each slot group and an HARQ-ACK on the target slot corresponding to each slot group; and sending the HARQ-ACK codebook.

20 Claims, 4 Drawing Sheets sending multi-TTI PDSCHs, the multi-TTI PDSCHs comprising more than one slot     S21 receiving a HARQ-ACK codebook comprised in a PUCCH for feeding back HARQ-ACKs of the multi-TTI PDSCHs, the HARQ-ACK codebook comprising a logical HARQ-ACK on a target slot     S22

(51) Int. Cl.
H04W 72/1273    (2023.01)
H04W 72/21    (2023.01)

(56) References Cited

FOREIGN PATENT DOCUMENTS

| | | | | | |
|---|---|---|---|---|---|
| CN | 111435872 | A | | 7/2020 | |
| CN | 111757489 | B | * | 5/2025 | ............ H04W 72/23 |
| JP | 2015-512571 | | | 4/2015 | |
| WO | WO 2020033237 | A1 | | 2/2020 | |
| WO | WO-2020141994 | A1 | * | 7/2020 | ............ H04W 72/23 |
| WO | WO 2020204561 | A1 | | 10/2020 | |

OTHER PUBLICATIONS

Notice of Reasons for Refusal issued by the Japanese Patent Office on Aug. 27, 2024, in corresponding Application No. JP 2023-553109, 4 pages.
Extended European Search Report issued in Application No. 21928542.6 dated Mar. 18, 2024, 14 pages.
LG Electronics, "PDSCH/PUSCH enhancements to support NR above 52.6 GHz," 3GPP TSG RAN WG1 #104-e, R1-2100896, e-Meeting, Jan. 25-Feb. 5, 2021, 14 pages.
Ericsson, "PDSCH/PUSCH enhancements," 3GPP TSG-RAN WG1 Meeting #104-e, Tdoc R1-2101310, Online, Jan. 25-Feb. 5, 2021, 27 pages.

* cited by examiner

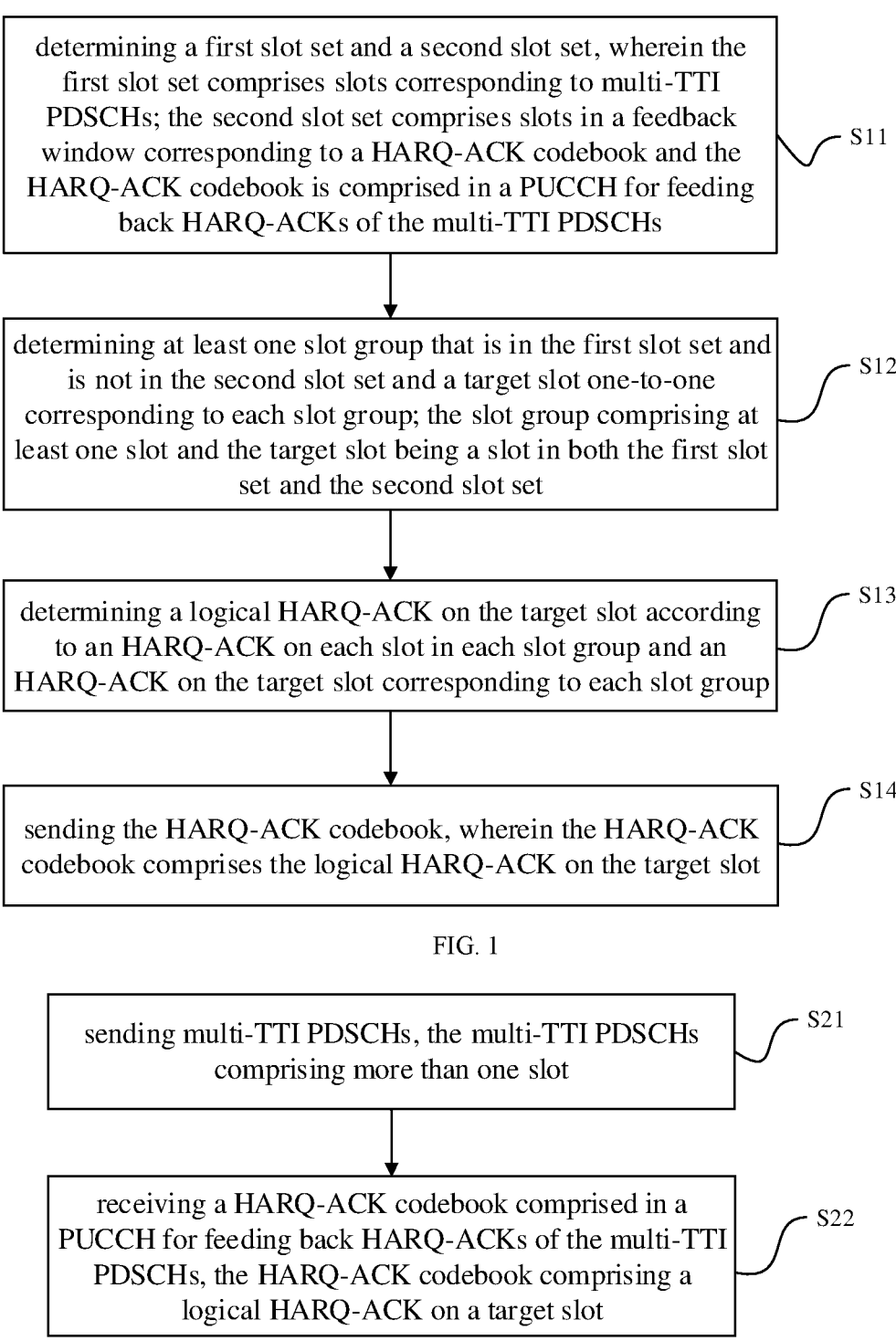

determining a first slot set and a second slot set, wherein the first slot set comprises slots corresponding to multi-TTI PDSCHs; the second slot set comprises slots in a feedback window corresponding to a HARQ-ACK codebook and the HARQ-ACK codebook is comprised in a PUCCH for feeding back HARQ-ACKs of the multi-TTI PDSCHs — S11 determining at least one slot group that is in the first slot set and is not in the second slot set and a target slot one-to-one corresponding to each slot group; the slot group comprising at least one slot and the target slot being a slot in both the first slot set and the second slot set — S12 determining a logical HARQ-ACK on the target slot according to an HARQ-ACK on each slot in each slot group and an HARQ-ACK on the target slot corresponding to each slot group — S13 sending the HARQ-ACK codebook, wherein the HARQ-ACK codebook comprises the logical HARQ-ACK on the target slot — S14

FIG. 1 sending multi-TTI PDSCHs, the multi-TTI PDSCHs comprising more than one slot — S21 receiving a HARQ-ACK codebook comprised in a PUCCH for feeding back HARQ-ACKs of the multi-TTI PDSCHs, the HARQ-ACK codebook comprising a logical HARQ-ACK on a target slot — S22

METHOD AND APPARATUS FOR SENDING HARQ-ACK, METHOD AND APPARATUS FOR RECEIVING HARQ-ACK, DEVICE, AND STORAGE MEDIUM

CROSS-REFERENCE TO RELATED APPLICATION

This application is a national phase of International Application No. PCT/CN2021/079171, filed on Mar. 4, 2021, the entire content of which is incorporated herein by reference.

TECHNICAL FIELD

The disclosure relates to the field of wireless communication technologies, and in particular, to a method, an apparatus and a device for sending a hybrid automatic repeat request acknowledgement (HARQ-ACK), a method, an apparatus and a device for receiving an HARQ-ACK, and a storage medium.

BACKGROUND

One downlink control information (DCI) may schedule one physical downlink shared channel (PDSCH) or one physical uplink shared channel (PUSCH) to ensure scheduling flexibility.

When a sub-carrier space (SCS) is 960 KHz, a corresponding slot is $\frac{1}{64}$ ms. When the SCS is larger and the slot is smaller, it may lead to high overhead for DCI blind detection if each PDSCH is scheduled by one separate DCI.

One DCI may schedule PDSCHs/PUSCHs of multiple slots in a multiple-transmission-time-interval (multi-TTI) design.

An example in a scenario of scheduling multi-TTI PDSCHs is used for illustration: one DCI may schedule 4 PDSCHs and the 4 PDSCHs sequentially corresponds to 4 consecutive slots. The 4 PDSCHs may be used to transmit different data, that is, different transport blocks (TBs). The multi-TTI design may reduce the number of DCIs, thereby reducing complexity when a user equipment (UE) blindly detects DCIs.

SUMMARY

According to a first aspect, a method for sending an HARQ-ACK is provided. The method is performed by a user equipment. The method includes:

determining a first slot set and a second slot set, in which the first slot set includes slots corresponding to multiple-transmission-time-interval (multi-TTI) physical downlink shared channels (PDSCHs); the second slot set includes slots in a feedback window corresponding to a HARQ-ACK codebook and the HARQ-ACK codebook is included in a physical uplink control channel (PUCCH) for feeding back HARQ-ACKs of the multi-TTI PDSCHs;

determining at least one slot group that is in the first slot set and is not in the second slot set and a target slot one-to-one corresponding to each slot group; in which the slot group includes at least one slot and the target slot is a slot in both the first slot set and the second slot set;

determining a logical HARQ-ACK on the target slot according to an HARQ-ACK on each slot in each slot group and an HARQ-ACK on the target slot corresponding to each slot group; and sending the HARQ-ACK codebook, in which the HARQ-ACK codebook includes the logical HARQ-ACK on the target slot.

According to a second aspect, a method for receiving an HARQ-ACK is provided. The method is performed by a network side device. The method includes:

sending multi-TTI PDSCHs; and receiving a HARQ-ACK codebook included in a PUCCH for feeding back HARQ-ACKs of the multi-TTI PDSCHs, the HARQ-ACK codebook including a logical HARQ-ACK on a target slot:

The logical HARQ-ACK on the target slot is determined by:

determining a first slot set and a second slot set, in which the first slot set includes slots corresponding to the multi-TTI PDSCHs; and the second slot set includes slots in a feedback window corresponding to the HARQ-ACK codebook;

determining at least one slot group that is in the first slot set and is not in the second slot set and a target slot one-to-one corresponding to each slot group; in which the slot group includes at least one slot and the target slot is a slot in both the first slot set and the second slot set; and determining the logical HARQ-ACK on the target slot according to an HARQ-ACK on each slot in each slot group and an HARQ-ACK on the target slot corresponding to each slot group.

According to a third aspect, a user equipment is provided, which includes:

a processor; and a memory for storing instructions executable by the processor.

The processor is configured to perform the steps of the method of sending an HARQ-ACK.

BRIEF DESCRIPTION OF THE DRAWINGS

The accompanying drawings described herein are used to provide a further understanding of embodiments of the disclosure and constitute a part of the disclosure. The implementations of the embodiments of the disclosure and their descriptions are used to explain the embodiments of the disclosure and do not constitute improper limitations to the embodiments of the disclosure. In the accompanying drawings:

The accompanying drawings, which are incorporated in and constitute a part of this specification, illustrate embodiments consistent with the disclosure and, together with the description, serve to explain the principles of the disclosure.

FIG. 1 is a flowchart of a method for sending an HARQ-ACK according to some embodiments.

FIG. 2 is a flowchart of a method for receiving an HARQ-ACK according to some embodiments.

DETAILED DESCRIPTION

Figures 3, 4:
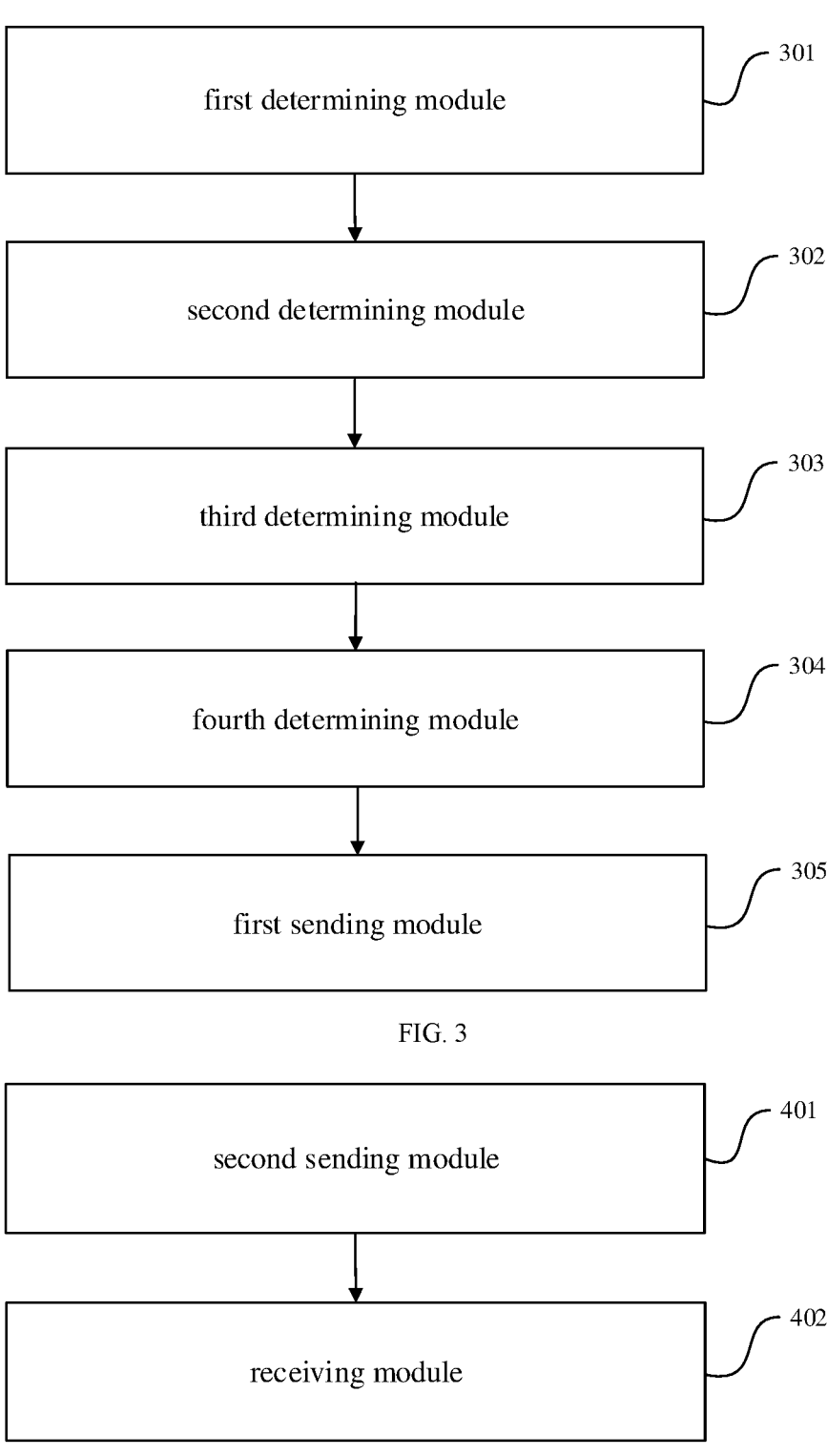
FIG. 3 is a block diagram of an apparatus for sending an HARQ-ACK according to some embodiments.
FIG. 4 is a block diagram of an apparatus for receiving an HARQ-ACK according to some embodiments.

Embodiments of the disclosure are now further described with reference to the accompanying drawings and implementations.

Reference are now made in detail to the embodiments, examples of which are illustrated in the accompanying drawings. The following description refers to the accompanying drawings in which the same numbers in different drawings represent the same or similar elements unless otherwise represented. The implementations set forth in the following description of the embodiments do not represent all implementations consistent with the disclosure. Instead, they are merely examples of apparatuses and methods consistent with aspects related to the disclosure as recited in the appended claims.

Type I codebook is a hybrid automatic repeat request acknowledgement (HARQ-ACK) feedback manner with a fixed-size HARQ-ACK codebook. On a HARQ-ACK feedback channel, it feeds back HARQ-ACKs for valid physical downlink shared channel (PDSCH) candidate time-frequency resources in all slots in a feedback window of a fixed size.

Configuration information about the Type 1 HARQ-ACK codebook includes:

Configuration information 1, a first set (referred to as K1 set) is agreed according to a protocol or configured according to a high layer signaling. K1 set includes L integer elements. Each integer element indicates a slot interval between a PDSCH and a channel used to feed back an HARQ-ACK for that PDSCH. K1 set is $\{k_1, k_2, \ldots, k_L\}$.

Default K1 set=$\{1,2,3,4,5,6,7,8\}$ specified by the protocol. K1 set configured by the base station is a maximum of 8 values from 0 to 15. Or in some protocols, K1 set configured by the base station is a maximum of 8 values from −1 and 1 to 15.

Configuration information 2, a first interval value indicated in downlink control information (DCI) is a value in K1 set. The first interval value is denoted by $k_i$.

Configuration information 3, a PDSCH scheduled by the DCI is on slot N (a slot with location identifier N).

According to the above configuration information, the user equipment may send an HARQ-ACK of the PDSCH scheduled by the DCI on the channel on slot $N+k_i$.

In the scenario of scheduling multi-TTI PDSCHs, the number of PDSCHs scheduled by one DCI may be semi-statically configured by a high layer. Or, a value range may be indicated by a protocol or configured by a high layer signaling and the number of PDSCHs may be dynamically indicated by the scheduling DCI.

In the scenario of scheduling multi-TTI PDSCHs, HARQ-ACKs of multiple PDSCHs need to be fed back on the same physical uplink control channel (PUCCH).

The feedback window corresponding to the Type 1 HARQ-ACK codebook that is included in the channel for feeding back the HARQ-ACK includes the following slots:
$\{$slot $N+k_i-k_1$, slot $N+k_i-k_2$, . . . , slot $N+k_i-k_{i-1}$, slot N, slot $N+k_i-k_i+1$, . . . , slot $N+k_i-k_L\}$.

The way of determining this window may be understood as pushing slot $N+k_i$ of the channel backwards to each integer value in K1 set respectively and slots obtained after pushing backwards form the feedback window, that is, the HARQ-ACK channel on slot $N+k_i$ needs to include HARQ-ACK information of each PDSCH in this feedback window.

When the PDSCH candidate time-frequency resource on a certain slot in this feedback window is not scheduled or there is actual PDSCH scheduling but the DCI indicates that an HARQ-ACK of this PDSCH is not fed back on slot $N+k_i$, a feedback result corresponding to the PDSCH candidate time-frequency resource on the slot is negative acknowledgement (NACK).

When one DCI schedules multiple-transmission-time-interval (multi-TTI) PDSCHs and the Type1 HARQ-ACK codebook is used, after the first interval value is indicated in the DCI, the Type1 HARQ-ACK codebook determined according to the first interval value may not include HARQ-ACK information for all PDSCHs scheduled by the DCI.

For example:

Multi-TTI PDSCHs scheduled by one DCI include M PDSCHs in total. Slots corresponding to the M PDSCHs are in sequence: slot n, slot n+1, . . . , slot n+M−1.

K1 set configured includes L values and K1 set is $\{k_1, k_2, \ldots, k_L\}$.

The first interval value indicated in the DCI is a value in K1 set. The first interval value is denoted by $k_i$.

The user equipment may send the HARQ-ACK of the PDSCH scheduled by the DCI on the channel on slot $n+M−1+k_i$.

The feedback window corresponding to the Type 1 HARQ-ACK codebook that is included in the channel for feeding back the HARQ-ACK includes the following slots:
$\{$slot $n+M−1+k_i-k_1$, slot $n+M−1+k_i-k_2$, . . . , slot $n+M−1+k_i-k_i-1$, slot $n+M−1$, slot $n+M−1+k_i-k_{i+1}$, . . . , slot $n+M−1+k_i-k_L\}$.

This window does not necessarily fully include a slot where each PDSCH in the multi-TTI PDSCHs, that is, each slot in $\{$slot n, slot n+1, . . . , slot n+M−1$\}$.

How to ensure that the Type 1 HARQ-ACK codebook that is included in the channel used for HARQ-ACK feedback includes the HARQ-ACK corresponding to a slot where each PDSCH in the multi-TTI PDSCHs is located is a technical problem to be solved.

It should be noted that the channel for HARQ-ACK feedback, described in the disclosure, may be a physical uplink control channel (PUCCH) or a physical uplink shared channel (PUSCH), which is not limited herein.

Some embodiments of the disclosure provide a method for sending an HARQ-ACK. The method is applicable to a user equipment. Referring to FIG. 1, FIG. 1 is a flowchart of a method for sending an HARQ-ACK according to some embodiments. As illustrated in FIG. 1, the method for sending an HARQ-ACK includes the following.

Step S11, a first slot set and a second slot set are determined. The first slot set includes slots corresponding to multi-TTI PDSCHs. The second slot set includes slots in a feedback window corresponding to a HARQ-ACK codebook. The HARQ-ACK codebook is included in a PUCCH for feeding back HARQ-ACKs of the multi-TTI PDSCHs.

Step S12, at least one slot group that is in the first slot set and is not in the second slot set is determined and a target slot one-to-one corresponding to each slot group is determined. The slot group includes at least one slot. The target slot is a slot in both the first slot set and the second slot set.

Step S13, a logical HARQ-ACK on the target slot is determined according to an HARQ-ACK on each slot in each slot group and an HARQ-ACK on the target slot corresponding to each slot group.

Step S14, the HARQ-ACK codebook is sent. The HARQ-ACK codebook includes the logical HARQ-ACK on the target slot.

In some embodiments, in step S11, the first slot set includes slots corresponding to the multi-TTI PDSCHs, which means that the first slot set includes slots corresponding to all PDSCHs in the multi-TTI PDSCHs.

In some embodiments, in step S11, the first slot set includes slots corresponding to the multi-TTI PDSCHs, which means that the first slot set includes a slot corresponding to each PDSCH in the multi-TTI PDSCHs.

In some embodiments, the HARQ-ACK codebook is a Type 1 HARQ-ACK codebook.

In some embodiments, slots in each slot group in the at least one slot group are consecutive, so that a distribution of slots in the partitioned slot group is relatively concentrated.

In some embodiments of the disclosure, the first slot set and the second slot set are determined, the at least one slot group that is included in the first slot set and not included in the second slot set is determined and at least one target slot that is included in both the first slot set and the second slot set is determined, a corresponding relationship between the slot group and the target slot is determined, and the HARQ-ACK of the corresponding target slot is logically bound with the HARQ-ACK of each slot on the slot group to obtain the logical HARQ-ACK. This logical HARQ-ACK is used as the final HARQ-ACK on the target slot, so that the logical HARQ-ACK on the target slot carries the HARQ-ACK of the corresponding slot group. Therefore, the HARQ-ACK codebook sent on the PUCCH indicated by the DCI may feed back the HARQ-ACKs of all PDSCHs in the multi-TTI PDSCHs.

Some embodiments of the disclosure provide a method for sending an HARQ-ACK, which is applicable to the user equipment. The method for sending an HARQ-ACK includes the following.

Step 2.1, a first slot set and a second slot set are determined. The first slot set includes slots corresponding to multi-TTI PDSCHs. The second slot set includes slots in a feedback window corresponding to a HARQ-ACK codebook. The HARQ-ACK codebook is included in a PUCCH for feeding back HARQ-ACKs of the multi-TTI PDSCHs.

Step 2.2, at least one slot group that is in the first slot set and is not in the second slot set is determined and a target slot one-to-one corresponding to each slot group is determined. The slot group includes at least one slot. The target slot is a slot in both the first slot set and the second slot set.

Step 2.3, a logical AND operation is performed according to an HARQ-ACK on each slot in each slot group and an HARQ-ACK on the target slot corresponding to each slot group and a result of the logical AND operation is determined as a logical HARQ-ACK on the target slot.

Step 2.4, the HARQ-ACK codebook is sent. The HARQ-ACK codebook includes the logical HARQ-ACK on the target slot.

In some embodiments, slots in each slot group in the at least one slot group are consecutive, so that a distribution of slots in the partitioned slot group is relatively concentrated.

When a sub-carrier space (SCS) is 450 KHz or 960 KHz, a corresponding slot is very short and it may be considered that channel conditions on multiple slots change little. Demodulation results of respective PDSCHs in the multi-TTI PDSCHs are relatively consistent, so after bundling multiple HARQ-ACKs, an HARQ-ACK of each PDSCH in the multi-TTI PDSCHs may still be more accurately reflected.

When determining a slot of a PUCCH for HARQ-ACK feedback, the slot of the PUCCH for HARQ-ACK feedback is determined according to a value of K1 indicated in the DCI and a slot position of the last PDSCH in the multi-TTI PDSCHs. Thus, the last PDSCH in the multi-TTI PDSCHs is included in the feedback window of the HARQ-ACK codebook. Therefore, when there is a slot group that is in the first slot set and is not included in the second slot set, a logical AND operation is performed on an HARQ-ACK of this slot group and an HARQ-ACK of the slot of the last PDSCH in the multi-TTI PDSCHs to obtain the logical HARQ-ACK.

Some embodiments of the disclosure provide a method for sending an HARQ-ACK, which is applicable to the user equipment. The method for sending an HARQ-ACK includes the following.

Step 3.1, a first slot set and a second slot set are determined. The first slot set includes slots corresponding to multi-TTI PDSCHs. The second slot set includes slots in a feedback window corresponding to a HARQ-ACK codebook. The HARQ-ACK codebook is included in a PUCCH for feeding back HARQ-ACKs of the multi-TTI PDSCHs.

Step 3.2, all slots that are in the first slot set and are not in the second slot set are determined as one slot group and a target slot corresponding to the one slot group is determined. The target slot is a slot in both the first slot set and the second slot set.

Step 3.3, a logical HARQ-ACK on the target slot is determined according to an HARQ-ACK on each slot in the one slot group and an HARQ-ACK on the target slot corresponding to the one slot group.

Step 3.4, the HARQ-ACK codebook is sent. The HARQ-ACK codebook includes the logical HARQ-ACK on the target slot.

In some embodiments, slots in each slot group in the at least one slot group are consecutive, so that a distribution of slots in the partitioned slot group is relatively concentrated.

In some embodiments of the disclosure, the first slot set and the second slot set are determined, all slots that are in the first slot set and are not in the second slot set are determined as one slot group, the target slot that is in both the first slot set and the second slot is determined, a corresponding relationship between the slot group and the target slot is determined, the HARQ-ACK of each slot on the slot group is logically bound with the HARQ-ACK of the corresponding target slot to obtain the logical HARQ-ACK, and this logical HARQ-ACK is used as the final HARQ-ACK on the target slot, so that the logical HARQ-ACK on the target slot carries the HARQ-ACK of the corresponding slot group. Therefore, the HARQ-ACK codebook sent on the PUCCH indicated by the DCI may feed back the HARQ-ACKs of all PDSCHs in the multi-TTI PDSCHs.

Some embodiments of the disclosure provide a method for sending an HARQ-ACK, which is applicable to the user equipment. The method for sending an HARQ-ACK includes the following.

Step 4.1, a first slot set and a second slot set are determined. The first slot set includes slots corresponding to multi-TTI PDSCHs. The second slot set includes slots in a feedback window corresponding to a HARQ-ACK codebook. The HARQ-ACK codebook is included in a PUCCH for feeding back HARQ-ACKs of the multi-TTI PDSCHs.

Step 4.2, all slots that are in the first slot set and are not in the second slot set are determined as one slot group and a target slot corresponding to the one slot group is determined. The target slot is a slot in both the first slot set and the second slot set. The target slot is located after the last slot in the one slot group.

Step 4.3, a logical HARQ-ACK on the target slot is determined according to an HARQ-ACK on each slot in the one slot group and an HARQ-ACK on the target slot corresponding to the one slot group.

Step 4.4, the HARQ-ACK codebook is sent. The HARQ-ACK codebook includes the logical HARQ-ACK on the target slot.

In some embodiments, slots in each slot group in the at least one slot group are consecutive, so that a distribution of slots in the partitioned slot group is relatively concentrated.

In an example:

Multi-TTI PDSCHs scheduled by one DCI include a total of 8 PDSCHs. Slots where the 8 PDSCHs are located are slot n, slot n+1, slot n+2, slot n+3, slot n+4, slot n+5, slot n+6, and slot n+7.

The first set, i.e., K1 set, includes 4 consecutive integer elements, specifically {0, 1, 2, 3}.

It is determined that the first interval value T is the first value in the first set K1 set, that is, 0.

It is determined that a feedback slot is slot n+7+T, that is, slot n+7. HARQ-ACKs of the multi-TTI PDSCHs scheduled by the DCI are sent on the PUCCH in this feedback slot.

The feedback window corresponding to the Type 1 HARQ-ACK codebook that is included in the PUCCH includes: {slot n+7, slot n+6, slot n+5, slot n+4}.

It is determined that slots corresponding to PDSCHs that are included in the multi-TTI PDSCHs and are not included in the HARQ-ACK codebook to from the slot group and this slot group includes {slot n, slot n+1, slot n+2, slot n+3}.

It is determined that slots corresponding to PDSCHs that are included in the multi-TTI PDSCHs and are included in the HARQ-ACK codebook: slot n+4, slot n+5, slot n+6, slot n+7.

It is determined that the target slot is any one of slot n+4, slot n+5, slot n+6, and slot n+7. Any one of slot n+4, slot n+5, slot n+6, and slot n+7 is located after the one slot group.

The logical AND operation is performed according to the HARQ-ACK on each slot in the one slot group and the HARQ-ACK on the target slot corresponding to the slot group and the result of the logical AND operation is determined as the logical HARQ-ACK on the target slot.

The HARQ-ACK codebook is sent. The HARQ-ACK codebook includes the logical HARQ-ACK on the target slot.

Some embodiments of the disclosure provide a method for sending an HARQ-ACK, which is applicable to the user equipment. The method for sending an HARQ-ACK includes the following.

Step 5.1, a first slot set and a second slot set are determined. The first slot set includes slots corresponding to multi-TTI PDSCHs. The second slot set includes slots in a feedback window corresponding to a HARQ-ACK codebook. The HARQ-ACK codebook is included in a PUCCH for feeding back HARQ-ACKs of the multi-TTI PDSCHs.

Step 5.2, all slots that are in the first slot set and are not in the second slot set are determined as one slot group and a target slot corresponding to the one slot group is determined. The target slot is a slot in both the first slot set and the second slot set. A time domain position of the target slot is closest to the last slot in the one slot group and the target slot is located after the last slot in the one slot group.

Step 5.3, a logical HARQ-ACK on the target slot is determined according to an HARQ-ACK on each slot in the one slot group and an HARQ-ACK on the target slot corresponding to the one slot group.

Step 5.4, the HARQ-ACK codebook is sent. The HARQ-ACK codebook includes the logical HARQ-ACK on the target slot.

In some embodiments, slots in each slot group in the at least one slot group are consecutive, so that a distribution of slots in the partitioned slot group is relatively concentrated.

In an example:

Multi-TTI PDSCHs scheduled by one DCI include a total of 8 PDSCHs. Slots where the 8 PDSCHs are located are slot n, slot n+1, slot n+2, slot n+3, slot n+4, slot n+5, slot n+6, and slot n+7.

The first set, i.e., K1 set, includes 4 consecutive integer elements, specifically {0, 1, 2, 3}.

It is determined that the first interval value T is the first value in the first set K1 set, that is, 0.

It is determined that a feedback slot is slot n+7+T, that is, slot n+7. HARQ-ACKs of the multi-TTI PDSCHs scheduled by the DCI are sent on the PUCCH in this feedback slot.

The feedback window corresponding to the Type 1 HARQ-ACK codebook that is included in the PUCCH includes: {slot n+7, slot n+6, slot n+5, slot n+4}.

It is determined that slots corresponding to PDSCHs that are included in the multi-TTI PDSCHs and are not included in the HARQ-ACK codebook to from the slot group and this slot group includes {slot n, slot n+1, slot n+2, slot n+3}.

It is determined that slots corresponding to PDSCHs that are included in the multi-TTI PDSCHs and are included in the HARQ-ACK codebook: slot n+4, slot n+5, slot n+6, slot n+7.

In slot n+4, slot n+5, slot n+6, and slot n+7, one having the time domain position closest to the last slot in the one slot group and located after the last slot in the one slot group is slot n+4. Slot n+4 is determined as the target slot.

The logical AND operation is performed according to the HARQ-ACK on each slot in the one slot group and the HARQ-ACK on the target slot corresponding to the slot group and the result of the logical AND operation is determined as the logical HARQ-ACK on the target slot.

The HARQ-ACK codebook is sent. The HARQ-ACK codebook includes the logical HARQ-ACK on the target slot.

Some embodiments of the disclosure provide a method for sending an HARQ-ACK, which is applicable to the user equipment. The method for sending an HARQ-ACK includes the following.

Step 6.1, a first slot set and a second slot set are determined. The first slot set includes slots corresponding to multi-TTI PDSCHs. The second slot set includes slots in a feedback window corresponding to a HARQ-ACK codebook. The HARQ-ACK codebook is included in a PUCCH for feeding back HARQ-ACKs of the multi-TTI PDSCHs.

Step 6.2, all slots that are in the first slot set and are not in the second slot set are determined as one slot group and a target slot corresponding to the one slot group is determined. The target slot is a slot in both the first slot set and the second slot set. The target slot is located before the last slot in the one slot group.

Step 6.3, a logical HARQ-ACK on the target slot is determined according to an HARQ-ACK on each slot in the one slot group and an HARQ-ACK on the target slot corresponding to the one slot group.

Step 6.4, the HARQ-ACK codebook is sent. The HARQ-ACK codebook includes the logical HARQ-ACK on the target slot.

In an example:

Multi-TTI PDSCHs scheduled by one DCI include a total of 4 PDSCHs. Slots where the 4 PDSCHs are located are slot n, slot n+1, slot n+2, and slot n+3 in sequence.

The first set, that is, K1 set, includes 3 integer elements, specifically {1, 3, 5}.

It is determined that the first interval value T is the first value in the first set K1 set, namely 1.

It is determined that the feedback slot is slot n+3+T, that is, slot n+4, and HARQ-ACKs of the multi-TTI PDSCHs scheduled by the DCI are sent on the PUCCH in this feedback slot.

The feedback window corresponding to the Type 1 HARQ-ACK codebook that is included in the PUCCH includes: {slot n+3, slot n+1, slot n−1}.

It is determined that slots corresponding to PDSCHs that are included in the multi-TTI PDSCHs and are not included in the HARQ-ACK codebook form a slot group and this slot group includes {slot n, slot n+2}.

It is determined that slots corresponding to PDSCHs that are included in the multi-TTI PDSCHs and are included in the HARQ-ACK codebook: slot n+1 and slot n+3.

One target slot is determined, which includes the slot of the PDSCH that is included in the multi-TTI PDSCHs and included in the HARQ-ACK codebook, and is located before the last slot in the one slot group, this is, the target slot is slot n+1.

The logical AND operation is performed according to the HARQ-ACK on each slot in the one slot group and the HARQ-ACK on the target slot corresponding to the slot group and the result of the logical AND operation is determined as the logical HARQ-ACK on the target slot.

The HARQ-ACK codebook is sent. The HARQ-ACK codebook includes the logical HARQ-ACK on the target slot.

Some embodiments of the disclosure provide a method for sending an HARQ-ACK, which is applicable to the user equipment. The method for sending an HARQ-ACK includes the following.

Step 7.1, a first slot set and a second slot set are determined. The first slot set includes slots corresponding to multi-TTI PDSCHs. The second slot set includes slots in a feedback window corresponding to a HARQ-ACK codebook. The HARQ-ACK codebook is included in a PUCCH for feeding back HARQ-ACKs of the multi-TTI PDSCHs.

Step 7.2, at least one slot group that is in the first slot set and is not in the second slot set is determined according to a first number and a second number, and a target slot one-to-one corresponding to each slot group is determined.

The first number is a number of slots that are in the first slot set and are not in the second slot set. The second number is a number of slots that are in both the first slot set and the second slot set. The slot group includes at least one slot. The target slot is a slot in both the first slot set and the second slot set.

Step 7.3, a logical HARQ-ACK on the target slot is determined according to an HARQ-ACK on each slot in each slot group and an HARQ-ACK on the target slot corresponding to each slot group.

Step 7.4, the HARQ-ACK codebook is sent. The HARQ-ACK codebook includes the logical HARQ-ACK on the target slot.

Some embodiments of the disclosure provide a method for sending an HARQ-ACK, which is applicable to the user equipment. The method for sending an HARQ-ACK includes the following.

Step 8.1, a first slot set and a second slot set are determined. The first slot set includes slots corresponding to multi-TTI PDSCHs. The second slot set includes slots in a feedback window corresponding to a HARQ-ACK codebook. The HARQ-ACK codebook is included in a PUCCH for feeding back HARQ-ACKs of the multi-TTI PDSCHs.

Step 8.2, at least one slot group that is in the first slot set and is not in the second slot set is determined according to a first number and a second number, and a target slot one-to-one corresponding to each slot group is determined.

In response to the first number being a number of slots that are in the first slot set and are not in the second slot set, the second number being a number of slots that are in both the first slot set and the second slot set, and the first number being a multiple of the second number, a quotient of the first number and the second number is determined; and it is determined that a number of the at least one slot group is the second number and a number of slots in each slot group is the quotient. The slot group includes at least one slot. The target slot is a slot in both the first slot set and the second slot set.

Step 8.3, a logical HARQ-ACK on the target slot is determined according to an HARQ-ACK on each slot in each slot group and an HARQ-ACK on the target slot corresponding to each slot group.

Step 8.4, the HARQ-ACK codebook is sent. The HARQ-ACK codebook includes the logical HARQ-ACK on the target slot.

In some embodiments, slots in each slot group in the at least one slot group are consecutive, so that a distribution of slots in the partitioned slot group is relatively concentrated.

In an example:

Multi-TTI PDSCHs scheduled by one DCI include a total of 8 PDSCHs. Slots where the 8 PDSCHs are located are slot n, slot n+1, slot n+2, slot n+3, slot n+4, slot n+5, slot n+6, and slot n+7.

The first set, that is, K1 set, includes 4 consecutive integer elements, specifically {0, 1, 2, 3}.

The first interval value T is determined to be 2 of the 4 consecutive integer elements.

It is determined that the feedback slot is slot n+7+T, that is, slot n+9, and HARQ-ACKs of the multi-TTI PDSCHs scheduled by the DCI may be sent on the PUCCH in this feedback slot.

The feedback window corresponding to the Type 1 HARQ-ACK codebook that is included in the PUCCH includes: {slot n+9, slot n+8, slot n+7, slot n+6}.

It is determined that slots corresponding to PDSCHs included in the multi-TTI PDSCHs and not included in the HARQ-ACK codebook include slot n, slot n+1, slot n+2, slot n+3, slot n+4, and slot n+5. The corresponding number of slots, that is, the first number, is 6.

It is determined that slots corresponding to PDSCHs included in the multi-TTI PDSCHs and included in the HARQ-ACK codebook include slot n+6 and slot n+7. The corresponding number of slots, that is, the second number, is 2.

The first number is a multiple of the second number. The quotient of the first number and the second number is determined to be 3, thereby determining that the number of at least one slot group is 2 and the number of slots included in each slot group is equal to 3.

The two slot groups are determined as the first slot group and the second slot group.

The first slot group includes slot n, slot n+1 and slot n+2. The first target slot corresponding to the first slot group is slot n+6.

The second slot group includes slot n+3, slot n+4 and slot n+5. The second target slot corresponding to the second slot group is slot n+7.

The logical AND operation is performed according to the HARQ-ACKs of slot n, slot n+1, slot n+2, and slot n+6, and the result of the logical AND operation is determined to be the logical HARQ-ACK on slot n+6.

The logical AND operation is performed according to the HARQ-ACKs of slot n+3, slot n+4, slot n+5, and slot n+7, and the result of the logical AND operation is determined to be the logical HARQ-ACK on slot n+7.

The HARQ-ACK codebook is sent. The HARQ-ACK codebook includes the logical HARQ-ACK on the first target slot and the logical HARQ-ACK on the second target slot.

Some embodiments of the disclosure provide a method for sending an HARQ-ACK, which is applicable to the user equipment. The method for sending an HARQ-ACK includes the following.

Step 9.1, a first slot set and a second slot set are determined. The first slot set includes slots corresponding to multi-TTI PDSCHs. The second slot set includes slots in a feedback window corresponding to a HARQ-ACK codebook. The HARQ-ACK codebook is included in a PUCCH for feeding back HARQ-ACKs of the multi-TTI PDSCHs.

Step 9.2, at least one slot group that is in the first slot set and is not in the second slot set is determined according to a first number and a second number, and a target slot one-to-one corresponding to each slot group is determined.

In response to the first number being a number of slots that are in the first slot set and are not in the second slot set, the second number being a number of slots that are in both the first slot set and the second slot set, and the first number being not a multiple of the second number, it is determined that a number of the at least one slot group is the second number and a number of slots in each slot group except a last slot group is the same. The slot group includes at least one slot. The target slot is a slot in both the first slot set and the second slot set.

Step 9.3, a logical HARQ-ACK on the target slot is determined according to an HARQ-ACK on each slot in each slot group and an HARQ-ACK on the target slot corresponding to each slot group.

Step 9.4, the HARQ-ACK codebook is sent. The HARQ-ACK codebook includes the logical HARQ-ACK on the target slot.

In some embodiments, slots in each slot group in the at least one slot group are consecutive, so that a distribution of slots in the partitioned slot group is relatively concentrated.

In some embodiments, the at least one slot group includes a slot group sequence arranged in a first time domain direction and a target slot sequence corresponding to the slot group sequence arranged in the first time domain direction is also arranged in the first time domain direction.

For example, the slot group sequence includes the first slot group, the second slot group and the third slot group in ascending order of the time axis of the time domain. The first slot group corresponds to the first target slot, the second slot group corresponds to the second target slot and the third slot group corresponds to the third target slot. The first target slot, the second target slot and the third target slot are arranged in ascending order of the time axis of the time domain.

In an example:

Multi-TTI PDSCHs scheduled by one DCI include a total of 8 PDSCHs. Slots where the 8 PDSCHs are located are slot n, slot n+1, slot n+2, slot n+3, slot n+4, slot n+5, slot n+6, and slot n+7.

The first set, that is, K1 set, includes 4 consecutive integer elements, specifically {0, 1, 2, 3}.

It is determined that the first interval value T is 1 of the 4 consecutive integer elements.

It is determined that the feedback slot is slot n+7+T, that is, slot n+8, and HARQ-ACKs of the multi-TTI PDSCHs scheduled by the DCI may be sent on the PUCCH on this feedback slot.

The feedback window corresponding to the Type 1 HARQ-ACK codebook that is included in the PUCCH includes: {slot n+8, slot n+7, slot n+6, slot n+5}.

It is determined that slots corresponding to PDSCHs included in the multi-TTI PDSCHs and not included in the HARQ-ACK codebook include slot n, slot n+1, slot n+2, slot n+3, and slot n+4. The corresponding number of slots, i.e. the first number, is 5.

It is determined that slots of PDSCHs included in the multi-TTI PDSCHs and included in the HARQ-ACK codebook include slot n+5, slot n+6, and slot n+7. The corresponding number of slots, that is, the second number, is 3.

The first number is not a multiple of the second number. It is determined that the number of the at least one slot group is 3. The number of slots in each slot group except the last slot group is the same, which is 2.

It is determined that the first slot group includes slot n and slot n+1, and the first target slot corresponding to the first slot group is slot n+5.

It is determined that the second slot group includes slot n+2 and slot n+3, and the second target slot corresponding to the second slot group is slot n+6.

It is determined that the third slot group includes slot n+4, and the third target slot corresponding to the third slot group is slot n+7.

The first slot group, the second slot group, and the third slot group are arranged in ascending order of the time axis of the time domain, and their corresponding first target slot group, second target slot group, and third target slot group are also arranged in ascending order of the time axis of the time domain.

The logical AND operation is performed according to the HARQ-ACKs of slot n, slot n+1, and slot n+5, and the result of the logical AND operation is determined to be the logical HARQ-ACK on slot n+5.

The logical AND operation is performed according to the HARQ-ACKs of slot n+2, slot n+3, and slot n+6, and the result of the logical AND operation is determined to be the logical HARQ-ACK on slot n+6.

The logical AND operation is performed according to the HARQ-ACKs of slot n+4 and slot n+7, and the result of the logical AND operation is determined to be the logical HARQ-ACK on slot n+7.

The HARQ-ACK codebook is sent. The HARQ-ACK codebook includes the logical HARQ-ACK on the first target slot n+5, the logical HARQ-ACK on the second target slot n+6 and the logical HARQ-ACK on the third target slot n+7.

Some embodiments of the disclosure provide a method for receiving an HARQ-ACK, which is applicable to a network side device. Referring to FIG. 2, FIG. 2 is a flowchart of a method for receiving an HARQ-ACK according to some embodiments. As illustrated in FIG. 2, the method for receiving an HARQ-ACK includes the following.

Step S21, multi-TTI PDSCHs are sent. The multi-TTI PDSCHs include more than one slot.

Step S22, a HARQ-ACK codebook included in a PUCCH for feeding back HARQ-ACKs of the multi-TTI PDSCHs is received. The HARQ-ACK codebook includes a logical HARQ-ACK on a target slot.

The target slot is a slot in both a first slot set and a second slot set and the logical HARQ-ACK on the target slot is determined by:

determining the first slot set and the second slot set, in which the first slot set includes slots corresponding to the multi-TTI PDSCHs: the second slot set includes slots in a feedback window corresponding to the HARQ-ACK codebook and the HARQ-ACK codebook is included in the PUCCH for feeding back the HARQ-ACKs of the multi-TTI PDSCHs;

determining at least one slot group that is in the first slot set and is not in the second slot set and a target slot one-to-one corresponding to each slot group: in which the slot group includes at least one slot and the target slot is a slot in both the first slot set and the second slot set; and determining the logical HARQ-ACK on the target slot according to an HARQ-ACK on each slot in each slot group and an HARQ-ACK on the target slot corresponding to each slot group.

In some embodiments, slots included in each slot group in the at least one slot group are consecutive slots.

In some embodiments, the at least one slot group includes a slot group sequence arranged in a first time domain direction and a target slot sequence corresponding to the slot group sequence arranged in the first time domain direction is also arranged in the first time domain direction.

Some embodiments of the disclosure provide a method for receiving an HARQ-ACK, which is applicable to a network side device. The method of receiving an HARQ-ACK includes the following:

Step 2-1, multi-TTI PDSCHs are sent. The multi-TTI PDSCHs include more than one slot.

Step 2-2, a HARQ-ACK codebook included in a PUCCH for feeding back HARQ-ACKs of the multi-TTI PDSCHs is received. The HARQ-ACK codebook includes a logical HARQ-ACK on a target slot.

The target slot is a slot in both a first slot set and a second slot set and the logical HARQ-ACK on the target slot is determined by:

determining the first slot set and the second slot set, in which the first slot set includes slots corresponding to the multi-TTI PDSCHs; the second slot set includes slots in a feedback window corresponding to the HARQ-ACK codebook and the HARQ-ACK codebook is included in the PUCCH for feeding back the HARQ-ACKs of the multi-TTI PDSCHs;

determining all slots that are in the first slot set and are not in the second slot set as one slot group and a target slot one-to-one corresponding to the one slot group: in which the one slot group includes at least one slot and the target slot is a slot in both the first slot set and the second slot set; and determining the logical HARQ-ACK on the target slot according to an HARQ-ACK on each slot in each slot group and an HARQ-ACK on the target slot corresponding to each slot group.

Some embodiments of the disclosure provide a method for receiving an HARQ-ACK, which is applicable to a network side device. The method of receiving an HARQ-ACK includes the following:

Step 3-1, multi-TTI PDSCHs are sent. The multi-TTI PDSCHs include more than one slot.

Step 3-2, a HARQ-ACK codebook included in a PUCCH for feeding back HARQ-ACKs of the multi-TTI PDSCHs is received. The HARQ-ACK codebook includes a logical HARQ-ACK on a target slot.

The target slot is a slot in both a first slot set and a second slot set and the logical HARQ-ACK on the target slot is determined by:

determining the first slot set and the second slot set, in which the first slot set includes slots corresponding to the multi-TTI PDSCHs: the second slot set includes slots in a feedback window corresponding to the HARQ-ACK codebook and the HARQ-ACK codebook is included in the PUCCH for feeding back the HARQ-ACKs of the multi-TTI PDSCHs;

determining all slots that are in the first slot set and are not in the second slot set as one slot group and a target slot one-to-one corresponding to the one slot group; in which the one slot group includes at least one slot, the target slot is a slot in both the first slot set and the second slot set, and the target slot is located after the last slot in the one slot group; and determining the logical HARQ-ACK on the target slot according to an HARQ-ACK on each slot in each slot group and an HARQ-ACK on the target slot corresponding to each slot group.

Some embodiments of the disclosure provide a method for receiving an HARQ-ACK, which is applicable to a network side device. The method of receiving an HARQ-ACK includes the following:

Step 4-1, multi-TTI PDSCHs are sent. The multi-TTI PDSCHs include more than one slot.

Step 4-2, a HARQ-ACK codebook included in a PUCCH for feeding back HARQ-ACKs of the multi-TTI PDSCHs is received. The HARQ-ACK codebook includes a logical HARQ-ACK on a target slot.

The target slot is a slot in both a first slot set and a second slot set and the logical HARQ-ACK on the target slot is determined by:

determining the first slot set and the second slot set, in which the first slot set includes slots corresponding to the multi-TTI PDSCHs: the second slot set includes slots in a feedback window corresponding to the HARQ-ACK codebook and the HARQ-ACK codebook is included in the PUCCH for feeding back the HARQ-ACKs of the multi-TTI PDSCHs;

determining all slots that are in the first slot set and are not in the second slot set as one slot group and a target slot one-to-one corresponding to the one slot group: in which the one slot group includes at least one slot, the target slot is a slot in both the first slot set and the second slot set, and a time domain position of the target slot is closest to the last slot in the one slot group and is located after the last slot in the one slot group;

determining the logical HARQ-ACK on the target slot according to an HARQ-ACK on each slot in each slot group and an HARQ-ACK on the target slot corresponding to each slot group.

Some embodiments of the disclosure provide a method for receiving an HARQ-ACK, which is applicable to a network side device. The method of receiving an HARQ-ACK includes the following:

Step 5-1, multi-TTI PDSCHs are sent. The multi-TTI PDSCHs include more than one slot.

Step 5-2, a HARQ-ACK codebook included in a PUCCH for feeding back HARQ-ACKs of the multi-TTI PDSCHs is received. The HARQ-ACK codebook includes a logical HARQ-ACK on a target slot.

The target slot is a slot in both a first slot set and a second slot set and the logical HARQ-ACK on the target slot is determined by:

determining the first slot set and the second slot set, in which the first slot set includes slots corresponding to the multi-TTI PDSCHs: the second slot set includes slots in a feedback window corresponding to the HARQ-ACK codebook and the HARQ-ACK codebook is included in the PUCCH for feeding back the HARQ-ACKs of the multi-TTI PDSCHs;

determining all slots that are in the first slot set and are not in the second slot set as one slot group and a target slot one-to-one corresponding to the one slot group: in which the one slot group includes at least one slot, the target slot is a slot in both the first slot set and the second slot set, and the target slot is located before the last slot in the one slot group;

determining the logical HARQ-ACK on the target slot according to an HARQ-ACK on each slot in each slot group and an HARQ-ACK on the target slot corresponding to each slot group.

Some embodiments of the disclosure provide a method for receiving an HARQ-ACK, which is applicable to a network side device. The method of receiving an HARQ-ACK includes the following:

Step 6-1, multi-TTI PDSCHs are sent. The multi-TTI PDSCHs include more than one slot.

Step 6-2, a HARQ-ACK codebook included in a PUCCH for feeding back HARQ-ACKs of the multi-TTI PDSCHs is received. The HARQ-ACK codebook includes a logical HARQ-ACK on a target slot.

The target slot is a slot in both a first slot set and a second slot set and the logical HARQ-ACK on the target slot is determined by:

determining the first slot set and the second slot set, in which the first slot set includes slots corresponding to the multi-TTI PDSCHs: the second slot set includes slots in a feedback window corresponding to the HARQ-ACK codebook and the HARQ-ACK codebook is included in the PUCCH for feeding back the HARQ-ACKs of the multi-TTI PDSCHs;

determining at least one slot group that is in the first slot set and is not in the second slot set according to a first number and a second number and a target slot one-to-one corresponding to each slot group, in which the first number is a number of slots that are in the first slot set and are not in the second slot set, and the second number is a number of slots that are in both the first slot set and the second slot set. The slot group includes at least one slot, and the target slot is a slot in both the first slot set and the second slot set;

determining the logical HARQ-ACK on the target slot according to an HARQ-ACK on each slot in each slot group and an HARQ-ACK on the target slot corresponding to each slot group.

Some embodiments of the disclosure provide a method for receiving an HARQ-ACK, which is applicable to a network side device. The method of receiving an HARQ-ACK includes the following:

Step 7-1, multi-TTI PDSCHs are sent. The multi-TTI PDSCHs include more than one slot.

Step 7-2, a HARQ-ACK codebook included in a PUCCH for feeding back HARQ-ACKs of the multi-TTI PDSCHs is received. The HARQ-ACK codebook includes a logical HARQ-ACK on a target slot.

The target slot is a slot in both a first slot set and a second slot set and the logical HARQ-ACK on the target slot is determined by:

determining the first slot set and the second slot set, in which the first slot set includes slots corresponding to the multi-TTI PDSCHs; the second slot set includes slots in a feedback window corresponding to the HARQ-ACK codebook and the HARQ-ACK codebook is included in the PUCCH for feeding back the HARQ-ACKs of the multi-TTI PDSCHs;

determining at least one slot group that is in the first slot set and is not in the second slot set according to a first number and a second number. In response to the first number being a multiple of the second number, a quotient of the first number and the second number is determined; and it is determined that a number of the at least one slot group is the second number and a number of slots in each slot group is the quotient. The first number is a number of slots that are in the first slot set and are not in the second slot set and the second number is a number of slots that are in both the first slot set and the second slot set. The slot group includes at least one slot;

determining a target slot one-to-one corresponding to each slot group, in which the target slot is a slot in both the first slot set and the second slot set;

determining the logical HARQ-ACK on the target slot according to an HARQ-ACK on each slot in each slot group and an HARQ-ACK on the target slot corresponding to each slot group.

Some embodiments of the disclosure provide a method for receiving an HARQ-ACK, which is applicable to a network side device. The method of receiving an HARQ-ACK includes the following:

Step 8-1, multi-TTI PDSCHs are sent. The multi-TTI PDSCHs include more than one slot.

Step 8-2, a HARQ-ACK codebook included in a PUCCH for feeding back HARQ-ACKs of the multi-TTI PDSCHs is received. The HARQ-ACK codebook includes a logical HARQ-ACK on a target slot.

The target slot is a slot in both a first slot set and a second slot set and the logical HARQ-ACK on the target slot is determined by:

determining the first slot set and the second slot set, in which the first slot set includes slots corresponding to the multi-TTI PDSCHs: the second slot set includes slots in a feedback window corresponding to the HARQ-ACK codebook and the HARQ-ACK codebook is included in the PUCCH for feeding back the HARQ-ACKs of the multi-TTI PDSCHs;

determining at least one slot group that is in the first slot set and is not in the second slot set according to a first number and a second number. In response to the first number being not a multiple of the second number, it is determined that a number of the at least one slot group is the second number and a number of slots in each slot group except the last slot group is the same. The first number is a number of slots that are in the first slot set and are not in the second slot set, and the second number is a number of slots that are in both the first slot set and the second slot set: the slot group includes at least one slot;

determining a target slot one-to-one corresponding to each slot group, in which the target slot is a slot in both the first slot set and the second slot set;

determining the logical HARQ-ACK on the target slot according to an HARQ-ACK on each slot in each slot group and an HARQ-ACK on the target slot corresponding to each slot group.

Some embodiments of the disclosure provide a method for receiving an HARQ-ACK, which is applicable to a network side device. The method of receiving an HARQ-ACK includes the following:

Step 9-1, multi-TTI PDSCHs are sent. The multi-TTI PDSCHs include more than one slot.

Step 9-2, a HARQ-ACK codebook included in a PUCCH for feeding back HARQ-ACKs of the multi-TTI PDSCHs is received. The HARQ-ACK codebook includes a logical HARQ-ACK on a target slot.

The target slot is a slot in both a first slot set and a second slot set and the logical HARQ-ACK on the target slot is determined by:

determining the first slot set and the second slot set, in which the first slot set includes slots corresponding to the multi-TTI PDSCHs: the second slot set includes slots in a feedback window corresponding to the HARQ-ACK codebook and the HARQ-ACK codebook is included in the PUCCH for feeding back the HARQ-ACKs of the multi-TTI PDSCHs;

determining at least one slot group that is in the first slot set and is not in the second slot set and a target slot one-to-one corresponding to each slot group: in which the slot group includes at least one slot and the target slot is a slot in both the first slot set and the second slot set; and performing a logical AND operation according to an HARQ-ACK on each slot in each slot group and an HARQ-ACK on the target slot corresponding to each slot group and determining a result of the logical AND operation as the logical HARQ-ACK on the target slot Some embodiments of the disclosure provide an apparatus for sending an HARQ-ACK. The apparatus is applicable to a user equipment. This apparatus is used to execute any one of method embodiments for sending in the foregoing method embodiments. Referring to FIG. 3, FIG. 3 is a block diagram of an apparatus for sending an HARQ-ACK according to some embodiments. As illustrated in FIG. 3, the apparatus for sending an HARQ-ACK includes a first determining module 301, a second determining module 302, a third determining module 303, a fourth determining module 304, and a first sending module 305.

The first determining module 301 is configured to determine a first slot set and a second slot set, in which the first slot set includes slots corresponding to multi-TTI PDSCHs; the second slot set includes slots in a feedback window corresponding to a HARQ-ACK codebook and the HARQ-ACK codebook is included in a PUCCH for feeding back HARQ-ACKs of the multi-TTI PDSCHs.

The second determining module 302 is configured to determine at least one slot group that is in the first slot set and is not in the second slot set, in which the slot group includes at least one slot.

The third determining module 303 is configured to determine a target slot one-to-one corresponding to each slot group: in which the target slot is a slot in both the first slot set and the second slot set.

The fourth determining module 304 is configured to determine a logical HARQ-ACK on the target slot according to an HARQ-ACK on each slot in each slot group and an HARQ-ACK on the target slot corresponding to each slot group.

The first sending module 305 is configured to send the HARQ-ACK codebook, in which the HARQ-ACK codebook includes the logical HARQ-ACK on the target slot.

Some embodiments of the disclosure provide an apparatus for sending an HARQ-ACK. The apparatus is applicable to a user equipment. This apparatus is used to execute any one of method embodiments for sending in the foregoing method embodiments. The apparatus for sending an HARQ-ACK includes a first determining module 301, a second determining module 302, a third determining module 303, a fourth determining module 304, and a first sending module 305.

The first determining module 301 is configured to determine a first slot set and a second slot set, in which the first slot set includes slots corresponding to multi-TTI PDSCHs; the second slot set includes slots in a feedback window corresponding to a HARQ-ACK codebook and the HARQ-ACK codebook is included in a PUCCH for feeding back HARQ-ACKs of the multi-TTI PDSCHs.

The second determining module 302 is configured to determine all slots that are in the first slot set and are not in the second slot set as one slot group.

The third determining module 303 is configured to determine a target slot one-to-one corresponding to the one slot group: in which the target slot is a slot in both the first slot set and the second slot set.

The fourth determining module 304 is configured to determine a logical HARQ-ACK on the target slot according to an HARQ-ACK on each slot in each slot group and an HARQ-ACK on the target slot corresponding to each slot group.

The first sending module 305 is configured to send the HARQ-ACK codebook, in which the HARQ-ACK codebook includes the logical HARQ-ACK on the target slot.

Some embodiments of the disclosure provide an apparatus for sending an HARQ-ACK. The apparatus is applicable to a user equipment. This apparatus is used to execute any one of method embodiments for sending in the foregoing method embodiments. The apparatus for sending an HARQ-ACK includes a first determining module 301, a second determining module 302, a third determining module 303, a fourth determining module 304, and a first sending module 305.

The first determining module 301 is configured to determine a first slot set and a second slot set, in which the first slot set includes slots corresponding to multi-TTI PDSCHs; the second slot set includes slots in a feedback window corresponding to a HARQ-ACK codebook and the HARQ-ACK codebook is included in a PUCCH for feeding back HARQ-ACKs of the multi-TTI PDSCHs.

The second determining module 302 is configured to determine all slots that are in the first slot set and are not in the second slot set as one slot group.

The third determining module 303 is configured to determine a target slot one-to-one corresponding to the one slot group: in which the target slot is a slot in both the first slot set and the second slot set, and a time domain position of the target slot is closest to the last slot in the one slot group and is located after the last slot in the one slot group.

The fourth determining module 304 is configured to determine a logical HARQ-ACK on the target slot according to an HARQ-ACK on each slot in each slot group and an HARQ-ACK on the target slot corresponding to each slot group.

The first sending module 305 is configured to send the HARQ-ACK codebook, in which the HARQ-ACK codebook includes the logical HARQ-ACK on the target slot.

Some embodiments of the disclosure provide an apparatus for sending an HARQ-ACK. The apparatus is applicable to a user equipment. This apparatus is used to execute any one of method embodiments for sending in the foregoing method embodiments. The apparatus for sending an HARQ-ACK includes a first determining module 301, a second determining module 302, a third determining module 303, a fourth determining module 304, and a first sending module 305.

The first determining module 301 is configured to determine a first slot set and a second slot set, in which the first slot set includes slots corresponding to multi-TTI PDSCHs; the second slot set includes slots in a feedback window corresponding to a HARQ-ACK codebook and the HARQ-ACK codebook is included in a PUCCH for feeding back HARQ-ACKs of the multi-TTI PDSCHs.

The second determining module 302 is configured to determine all slots that are in the first slot set and are not in the second slot set as one slot group.

The third determining module 303 is configured to determine a target slot one-to-one corresponding to the one slot group: in which the target slot is a slot in both the first slot set and the second slot set, and the target slot is located before the last slot in the one slot group.

The fourth determining module 304 is configured to determine a logical HARQ-ACK on the target slot according to an HARQ-ACK on each slot in each slot group and an HARQ-ACK on the target slot corresponding to each slot group.

The first sending module 305 is configured to send the HARQ-ACK codebook, in which the HARQ-ACK codebook includes the logical HARQ-ACK on the target slot.

Some embodiments of the disclosure provide an apparatus for sending an HARQ-ACK. The apparatus is applicable to a user equipment. This apparatus is used to execute any one of method embodiments for sending in the foregoing method embodiments. The apparatus for sending an HARQ-ACK includes a first determining module 301, a second determining module 302, a third determining module 303, a fourth determining module 304, and a first sending module 305.

The first determining module 301 is configured to determine a first slot set and a second slot set, in which the first slot set includes slots corresponding to multi-TTI PDSCHs; the second slot set includes slots in a feedback window corresponding to a HARQ-ACK codebook and the HARQ-ACK codebook is included in a PUCCH for feeding back HARQ-ACKs of the multi-TTI PDSCHs.

The second determining module 302 is configured to determine at least one slot group that is in the first slot set and is not in the second slot set according to a first number and a second number, the first number being a number of slots that are in the first slot set and are not in the second slot set, and the second number being a number of slots that are in both the first slot set and the second slot set.

The third determining module 303 is configured to determine a target slot one-to-one corresponding to each slot group: in which the target slot is a slot in both the first slot set and the second slot set.

The fourth determining module 304 is configured to determine a logical HARQ-ACK on the target slot according to an HARQ-ACK on each slot in each slot group and an HARQ-ACK on the target slot corresponding to each slot group.

The first sending module 305 is configured to send the HARQ-ACK codebook, in which the HARQ-ACK codebook includes the logical HARQ-ACK on the target slot.

Some embodiments of the disclosure provide an apparatus for sending an HARQ-ACK. The apparatus is applicable to a user equipment. This apparatus is used to execute any one of method embodiments for sending in the foregoing method embodiments. The apparatus for sending an HARQ-ACK includes a first determining module 301, a second determining module 302, a third determining module 303, a fourth determining module 304, and a first sending module 305.

The first determining module 301 is configured to determine a first slot set and a second slot set, in which the first slot set includes slots corresponding to multi-TTI PDSCHs: the second slot set includes slots in a feedback window corresponding to a HARQ-ACK codebook and the HARQ-ACK codebook is included in a PUCCH for feeding back HARQ-ACKs of the multi-TTI PDSCHs.

The second determining module 302 is configured to determine at least one slot group that is in the first slot set and is not in the second slot set according to a first number and a second number. In detail, in response to the first number being a multiple of the second number, a quotient of the first number and the second number is determined; and it is determined that a number of the at least one slot group is the second number and a number of slots in each slot group is the quotient. The first number is a number of slots that are in the first slot set and are not in the second slot set, and the second number is a number of slots that are in both the first slot set and the second slot set.

The third determining module 303 is configured to determine a target slot one-to-one corresponding to each slot group: in which the target slot is a slot in both the first slot set and the second slot set.

The fourth determining module 304 is configured to determine a logical HARQ-ACK on the target slot according to an HARQ-ACK on each slot in each slot group and an HARQ-ACK on the target slot corresponding to each slot group.

The first sending module 305 is configured to send the HARQ-ACK codebook, in which the HARQ-ACK codebook includes the logical HARQ-ACK on the target slot.

Some embodiments of the disclosure provide an apparatus for sending an HARQ-ACK. The apparatus is applicable to a user equipment. This apparatus is used to execute any one of method embodiments for sending in the foregoing method embodiments. The apparatus for sending an HARQ-ACK includes a first determining module 301, a second determining module 302, a third determining module 303, a fourth determining module 304, and a first sending module 305.

The first determining module 301 is configured to determine a first slot set and a second slot set, in which the first slot set includes slots corresponding to multi-TTI PDSCHs; the second slot set includes slots in a feedback window corresponding to a HARQ-ACK codebook and the HARQ-ACK codebook is included in a PUCCH for feeding back HARQ-ACKs of the multi-TTI PDSCHs.

The second determining module 302 is configured to determine at least one slot group that is in the first slot set and is not in the second slot set according to a first number and a second number. In detail, in response to the first number being not a multiple of the second number, it is determined that a number of the at least one slot group is the second number and a number of slots in each slot group except the last slot group is the same. The first number is a number of slots that are in the first slot set and are not in the second slot set, and the second number is a number of slots that are in both the first slot set and the second slot set.

The third determining module 303 is configured to determine a target slot one-to-one corresponding to each slot group: in which the target slot is a slot in both the first slot set and the second slot set.

The fourth determining module 304 is configured to determine a logical HARQ-ACK on the target slot according to an HARQ-ACK on each slot in each slot group and an HARQ-ACK on the target slot corresponding to each slot group.

The first sending module 305 is configured to send the HARQ-ACK codebook, in which the HARQ-ACK codebook includes the logical HARQ-ACK on the target slot.

Some embodiments of the disclosure provide an apparatus for sending an HARQ-ACK. The apparatus is applicable to a user equipment. This apparatus is used to execute any one of method embodiments for sending in the foregoing method embodiments. Referring to FIG. 3, FIG. 3 is a block diagram of an apparatus for sending an HARQ-ACK according to some embodiments. As illustrated in FIG. 3, the apparatus for sending an HARQ-ACK includes a first determining module 301, a second determining module 302, a third determining module 303, a fourth determining module 304, and a first sending module 305.

The first determining module 301 is configured to determine a first slot set and a second slot set, in which the first slot set includes slots corresponding to multi-TTI PDSCHs; the second slot set includes slots in a feedback window corresponding to a HARQ-ACK codebook and the HARQ-ACK codebook is included in a PUCCH for feeding back HARQ-ACKs of the multi-TTI PDSCHs.

The second determining module 302 is configured to determine at least one slot group that is in the first slot set and is not in the second slot set, in which the slot group includes at least one slot.

The third determining module 303 is configured to determine a target slot one-to-one corresponding to each slot group: in which the target slot is a slot in both the first slot set and the second slot set.

The fourth determining module 304 is configured to perform a logical AND operation according to an HARQ-ACK on each slot in each slot group and an HARQ-ACK on the target slot corresponding to each slot group and determine a result of the logical AND operation as a logical HARQ-ACK on the target slot.

The first sending module 305 is configured to send the HARQ-ACK codebook, in which the HARQ-ACK codebook includes the logical HARQ-ACK on the target slot.

Some embodiments of the disclosure provide an apparatus for receiving an HARQ-ACK. The apparatus is applicable to a network side device. This apparatus is used to execute any one of method embodiments for receiving in the foregoing method embodiments. Referring to FIG. 4, FIG. 4 is a block diagram of an apparatus for sending an HARQ-ACK according to some embodiments. As illustrated in FIG. 4, the apparatus for receiving an HARQ-ACK includes a second sending module 401 and a receiving module 402.

The second sending module 401 is configured to send multi-TTI PDSCHs, in which the multi-TTI PDSCHs includes more than one slot.

The receiving module 402 is configured to receive a HARQ-ACK codebook included in a PUCCH for feeding back HARQ-ACKs of the multi-TTI PDSCHs, in which the HARQ-ACK codebook includes a logical HARQ-ACK on a target slot.

The target slot is a slot in both a first slot set and a second slot set and the logical HARQ-ACK on the target slot is determined by:

determining the first slot set and the second slot set, in which the first slot set includes slots corresponding to the multi-TTI PDSCHs: the second slot set includes slots in a feedback window corresponding to the HARQ-ACK codebook and the HARQ-ACK codebook is included in the PUCCH for feeding back the HARQ-ACKs of the multi-TTI PDSCHs;

determining at least one slot group that is in the first slot set and is not in the second slot set and a target slot one-to-one corresponding to each slot group: in which the slot group includes at least one slot and the target slot is a slot in both the first slot set and the second slot set; and determining the logical HARQ-ACK on the target slot according to an HARQ-ACK on each slot in each slot group and an HARQ-ACK on the target slot corresponding to each slot group.

In some embodiments, determining the at least one slot group that is in the first slot set and is not in the second slot set includes:

determining all slots that are in the first slot set and are not in the second slot set as one slot group.

In some embodiments, determining the target slot one-to-one corresponding to each slot group includes:

determining the target slot located after the last slot in the one slot group.

In some embodiments, determining the target slot one-to-one corresponding to each slot group includes:

determining the target slot that has a time domain position closest to a last slot in the one slot group and is located after the last slot in the one slot group.

In some embodiments, determining the target slot one-to-one corresponding to each slot group includes:

determining the target slot located before the last slot in the one slot group.

In some embodiments, determining the at least one slot group that is in the first slot set and is not in the second slot set and the target slot one-to-one corresponding to each slot group includes:

determining the at least one slot group that is in the first slot set and is not in the second slot set according to a first number and a second number, the first number being a number of slots that are in the first slot set and are not in the second slot set, and the second number being a number of slots that are in both the first slot set and the second slot set.

In some embodiments, determining the at least one slot group that is in the first slot set and is not in the second slot set according to the first number and the second number includes:

in response to the first number being a multiple of the second number, determining a quotient of the first number and the second number; and determining that a number of the at least one slot group is the second number, and a number of slots in each slot group is the quotient.

In some embodiments, determining the at least one slot group that is in the first slot set and is not in the second slot set according to the first number and the second number includes:

in response to the first number being not a multiple of the second number, determining that a number of the at least one slot group is the second number, and a number of slots in each slot group except the last slot group is the same.

In some embodiments, slots in each slot group in the at least one slot group are consecutive slots.

In some embodiments, the at least one slot group includes a slot group sequence arranged in a first time domain direction and a target slot sequence corresponding to the slot group sequence arranged in the first time domain direction is also arranged in the first time domain direction.

In some embodiments, determining the logical HARQ-ACK on the target slot according to the HARQ-ACK on each slot in each slot group and the HARQ-ACK on the target slot corresponding to each slot group includes:

performing a logical AND operation according to the HARQ-ACK on each slot in each slot group and the HARQ-ACK on the target slot corresponding to each slot group and determining a result of the logical AND operation as the logical HARQ-ACK on the target slot.

Figure 5:
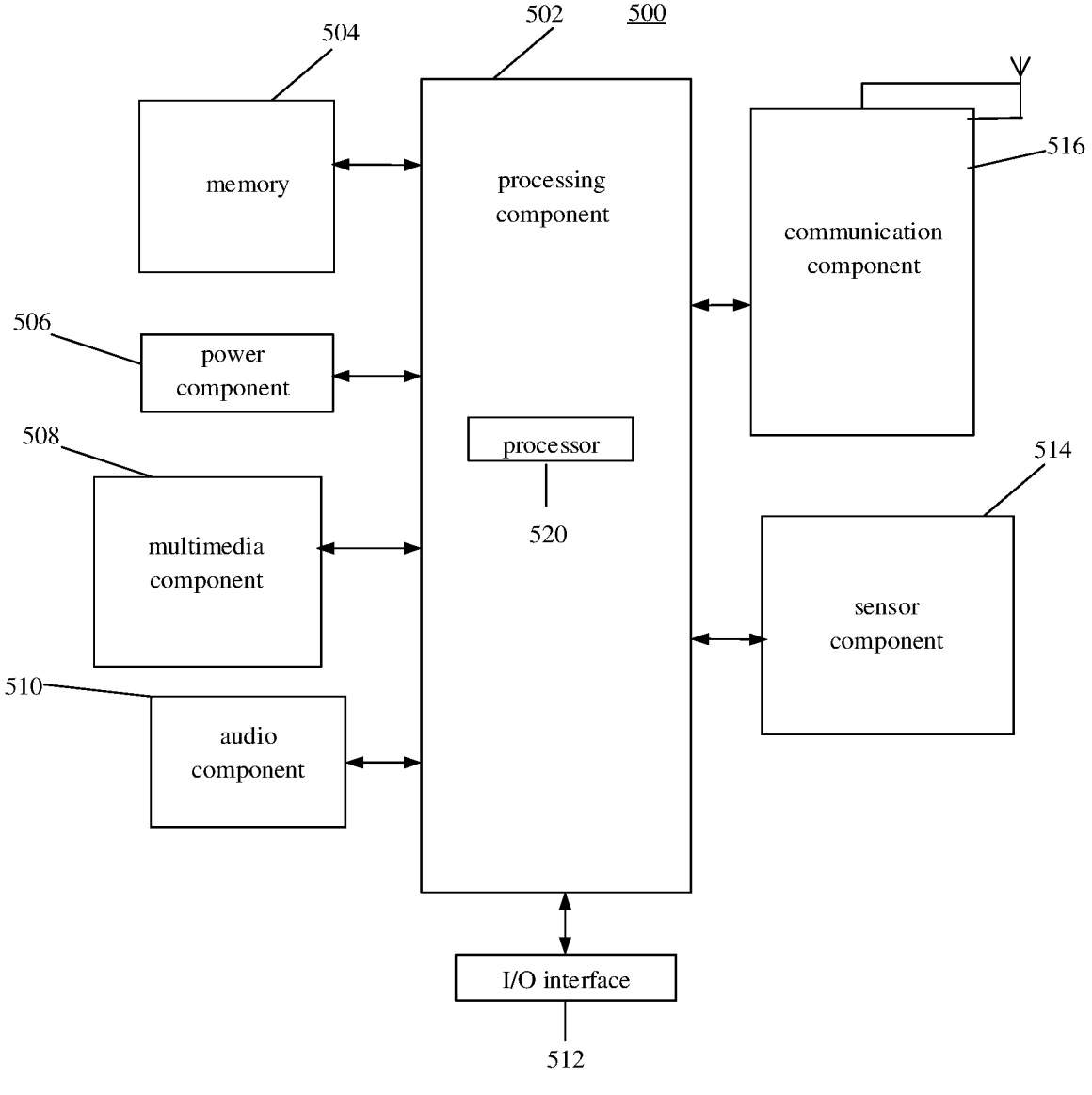
FIG. 5 is a block diagram of a device for sending an HARQ-ACK according to some embodiments.

FIG. 5 is a block diagram of a device 500 for sending an HARQ-ACK according to some embodiments. For example, For example, the device 500 may be a mobile phone, a computer, a digital broadcast terminal, a messaging device, a gaming console, a tablet, a medical device, exercise equipment, a personal digital assistant, and the like.

Referring to FIG. 5, the device 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The multimedia component 508 includes a screen providing an output interface between the device 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and the rear camera may receive an external multimedia datum while the device 500 is in an operation mode, such as a photographing mode or a video mode. Each of the front camera and the rear camera may be a fixed optical lens system or have focus and optical zoom capability. The audio component 510 is configured to output and/or input audio signals. For example, the audio component 510 includes a microphone ("MIC") configured to receive an external audio signal when the device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 500. For instance, the sensor component 514 may detect an open/closed status of the device 500, relative positioning of components, e.g., the display and the keypad, of the device 500, a change in position of the device 500 or a component of the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the device 500 and other devices. The device 500 can access a wireless network based on a communication standard, such as WiFi, 2G, or 3G, or a combination thereof. In one some embodiment, the communication component 516 receives a broadcast signal or broadcast associated information from an external broadcast management system via a broadcast channel. In one some embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer readable storage medium including instructions, such as included in the memory 504, executable by the processor 520 in the device 500, for performing the above-described methods. For example, the non-transitory computer-readable storage medium may be a ROM, a RAM, a CD-ROM, a magnetic tape, a floppy disc, an optical data storage device, and the like.

Figure 6:
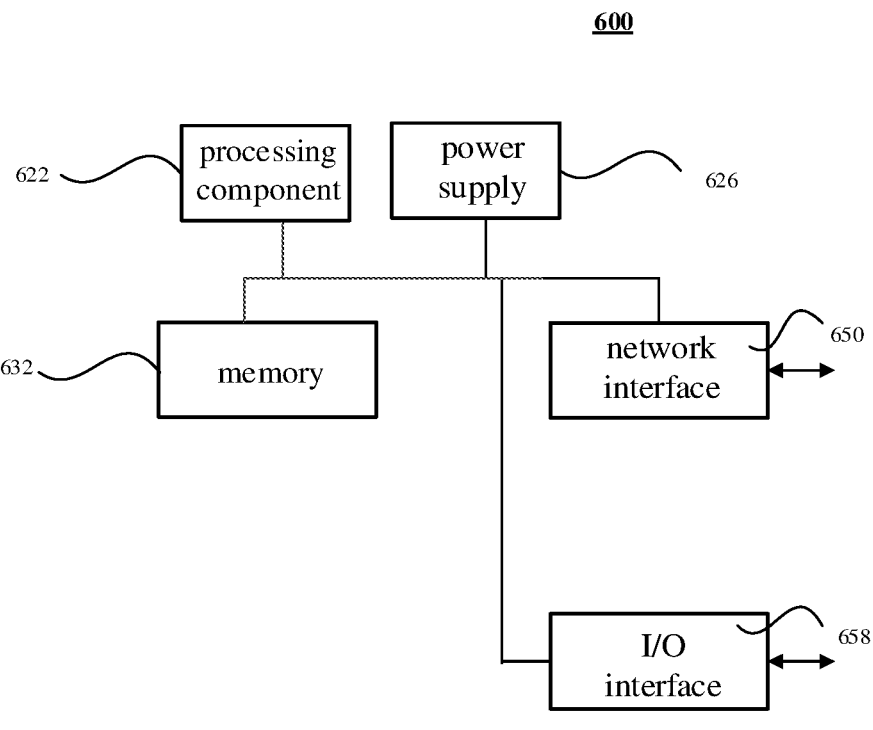
FIG. 6 is a block diagram of a device for receiving an HARQ-ACK according to some embodiments.

FIG. 6 is a block diagram of a device 600 for receiving an HARQ-ACK according to some embodiments. For example, the device 600 may be provided as a server. The device 600 includes a processing component 622, which further includes one or more processors, and a memory resource, represented by a memory 632, for storing instructions executable by the processing component 622, such as applications. An application stored in the memory 632 may include one or more modules, each corresponding to a set of instructions. Furthermore, the processing component 622 is configured to execute instructions to perform the above-described methods of receiving an HARQ-ACK.

The device 600 may also include a power supply 626 configured to perform power management of the device 600, a wired or wireless network interface 650 configured to connect the device 600 to a network, and an input output (I/O) interface 659. The device 600 may operate based on an operating system stored in the memory 632, such as Windows Server™, Mac OS X™, Unix™, Linux™, Free-BSD™, or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

INDUSTRIAL APPLICABILITY

In the disclosure, the first slot set and the second slot set are determined, the at least one slot group that is included in the first slot set and not included in the second slot set is determined and at least one target slot that is included in both the first slot set and the second slot set is determined, a corresponding relationship between the slot group and the target slot is determined, and the HARQ-ACK of the corresponding target slot is logically bound with the HARQ-ACK of each slot on the slot group to obtain the logical HARQ-ACK. This logical HARQ-ACK is used as the final HARQ-ACK on the target slot, so that the logical HARQ-ACK on the target slot carries the HARQ-ACK of the corresponding slot group. Therefore, the HARQ-ACK codebook sent on the PUCCH indicated by the DCI may feed back the HARQ-ACKs of all PDSCHs in the multi-TTI PDSCHs.

What is claimed is:

1. A method for sending a hybrid automatic repeat request acknowledgement (HARQ-ACK), performed by a user equipment, the method comprising:

determining a first slot set and a second slot set, wherein the first slot set comprises slots corresponding to multiple-transmission-time-interval (multi-TTI) physical downlink shared channels (PDSCHs), and the second slot set comprises slots in a feedback window corresponding to a Type1 HARQ-ACK codebook and the Type1 HARQ-ACK codebook is comprised in a physical uplink control channel (PUCCH) for feeding back HARQ-ACKs of the multi-TTI PDSCHs;

determining at least one slot group that is in the first slot set and is not in the second slot set and determining at least one target slot being in one-to-one correspondence with the at least one slot group, wherein each of the at least one slot group comprises at least one slot, and each of the at least one target slot is a slot in both the first slot set and the second slot set;

determining a logical HARQ-ACK on each of the at least one target slot according to an HARQ-ACK on the target slot and an HARQ-ACK on each slot in a slot group corresponding to the target slot; and sending the HARQ-ACK codebook, wherein the HARQ-ACK codebook comprises the logical HARQ-ACK on the target slot.

2. The method of claim 1, wherein determining the at least one slot group that is in the first slot set and is not in the second slot set comprises:

determining all slots that are in the first slot set and are not in the second slot set as one slot group.

3. The method of claim 2, wherein determining the at least one target slot being in one-to-one correspondence with the at least one slot group comprises:

determining the target slot located after a last slot in the one slot group.

4. The method of claim 2, wherein determining the at least one target slot being in one-to-one correspondence with the at least one slot group comprises:

determining the target slot that has a time domain position closest to a last slot in the one slot group and is located after the last slot in the one slot group.

5. The method of claim 2, wherein determining the at least one target slot being in one-to-one correspondence with the at least one slot group comprises:

determining the target slot located before a last slot in the one slot group.

6. The method of claim 1, wherein determining the at least one slot group that is in the first slot set and is not in the second slot set comprises:

determining the at least one slot group that is in the first slot set and is not in the second slot set according to a first number and a second number, the first number being a number of slots that are in the first slot set and are not in the second slot set and the second number being a number of slots that are in both the first slot set and the second slot set.

7. The method of claim 6, wherein determining the at least one slot group that is in the first slot set and is not in the second slot set according to the first number and the second number comprises:

in response to the first number being a multiple of the second number, determining a quotient of the first number and the second number; and determining that a number of the at least one slot group is the second number and a number of slots in each slot group is the quotient.

8. The method of claim 6, wherein determining the at least one slot group that is in the first slot set and is not in the second slot set according to the first number and the second number comprises:

in response to the first number being not a multiple of the second number, determining that a number of the at least one slot group is the second number and a number of slots in each slot group except a last slot group is the same.

9. The method of claim 1, wherein slots in each slot group in the at least one slot group are consecutive slots.

10. The method of claim 1, wherein the at least one slot group comprises a slot group sequence arranged in a first time domain direction and a target slot sequence corresponding to the slot group sequence arranged in the first time domain direction is also arranged in the first time domain direction.

11. The method of claim 1, wherein determining the logical HARQ-ACK on each of the at least one target slot according to the HARQ-ACK on the target slot and the HARQ-ACK on each slot in the slot group corresponding to the target slot comprises:

performing a logical AND operation according to the HARQ-ACK on the target slot and the HARQ-ACK on each slot in the slot group corresponding to the target slot and determining a result of the logical AND operation as the logical HARQ-ACK on the target slot.

12. A method for receiving a hybrid automatic repeat request acknowledgement (HARQ-ACK), performed by a network side device, the method comprises:

sending multiple-transmission-time-interval (multi-TTI) physical downlink shared channels (PDSCHs); and receiving a HARQ-ACK codebook comprised in a physical uplink control channel (PUCCH) for feeding back HARQ-ACKs of the multi-TTI PDSCHs, the HARQ-ACK codebook comprising a logical HARQ-ACK on each of at least one target slot;

wherein the logical HARQ-ACK on each of at least one target slot is determined by:

determining a first slot set and a second slot set, wherein the first slot set comprises slots corresponding to the multi-TTI PDSCHs, and the second slot set comprises slots in a feedback window corresponding to a Type1 HARQ-ACK codebook;

determining at least one slot group that is in the first slot set and is not in the second slot set and determining at least one target slot being in one-to-one correspondence with the at least one slot group, wherein each of the at least one slot group comprises at least one slot, and each of the at least one target slot is a slot in both the first slot set and the second slot set; and determining the logical HARQ-ACK on each of the at least one target slot according to an HARQ-ACK on the target slot and an HARQ-ACK on each slot in a slot group corresponding to the target slot.

13. The method of claim 12, wherein determining the at least one slot group that is in the first slot set and is not in the second slot set comprises:

determining all slots that are in the first slot set and are not in the second slot set as one slot group.

14. The method of claim 13, wherein determining the at least one target slot being in one-to-one correspondence with the at least one slot group comprises:

determining the target slot located after a last slot in the one slot group.

15. The method of claim 13, wherein determining the at least one target slot being in one-to-one correspondence with the at least one slot group comprises one of:

determining the target slot that has a time domain position closest to a last slot in the one slot group and is located after the last slot in the one slot group; or determining the target slot located before a last slot in the one slot group.

16. The method of claim 12, wherein determining the at least one slot group that is in the first slot set and is not in the second slot set comprises:

determining the at least one slot group that is in the first slot set and is not in the second slot set according to a first number and a second number, the first number being a number of slots that are in the first slot set and are not in the second slot set and the second number being a number of slots that are in both the first slot set and the second slot set.

17. The method of claim 16, wherein determining the at least one slot group that is in the first slot set and is not in the second slot set according to the first number and the second number comprises:

in response to the first number being a multiple of the second number, determining a quotient of the first number and the second number, and determining that a number of the at least one slot group is the second number and a number of slots in each slot group is the quotient; or in response to the first number not being a multiple of the second number, determining that a number of the at least one slot group is the second number and a number of slots in each slot group except a last slot group is the same.

18. The method of claim 12, wherein determining the logical HARQ-ACK on each of the at least one target slot according to the HARQ-ACK on the target slot and the HARQ-ACK on each slot in the slot group corresponding to the target slot comprises:

performing a logical AND operation according to the HARQ-ACK on the target slot and the HARQ-ACK on each slot in the slot group corresponding to the target slot and determining a result of the logical AND operation as the logical HARQ-ACK on the target slot.

19. A user equipment, comprising:

a processor; and a memory for storing instructions executable by the processor, wherein the processor is configured to:

determine a first slot set and a second slot set, wherein the first slot set comprises slots corresponding to multiple-transmission-time-interval (multi-TTI) physical downlink shared channels (PDSCHs), and the second slot set comprises slots in a feedback window corresponding to a Type1 hybrid automatic repeat request acknowledgement (HARQ-ACK) codebook and the Type1 HARQ-ACK codebook is comprised in a physical uplink control channel (PUCCH) for feeding back HARQ-ACKs of the multi-TTI PDSCHs;

determine at least one slot group that is in the first slot set and is not in the second slot set and determining at least one target slot being in one-to-one correspondence with the at least one slot group, wherein each of the at least one slot group comprises at least one slot, and each of the at least one target slot is a slot in both the first slot set and the second slot set;

determine a logical HARQ-ACK on each of the at least one target slot according to an HARQ-ACK on the target slot and an HARQ-ACK on each slot in a slot group corresponding to the target slot; and send the HARQ-ACK codebook, wherein the HARQ-ACK codebook comprises the logical HARQ-ACK on the target slot.

20. A network side device, comprising:

a processor; and a memory for storing instructions executable by the processor, wherein the processor is configured to perform the method of claim 12.

\* \* \* \* \*